United States Patent
Hashizume et al.

(10) Patent No.: US 7,406,387 B2
(45) Date of Patent: Jul. 29, 2008

(54) APPARATUS AND METHOD FOR DETECTING BLOCKAGE OF IMPULSE LINES

(75) Inventors: Takumi Hashizume, 1525-141, Kashiwai-cho, Hanamigawa-ku, Chiba-shi, Chiba-ken (JP); Tetsuya Wakui, 5-23-402, 6-cho, Kita-mikunigaoka-cho, Sakai-ku, Sakai, Osaka (JP); Jyun-ichi Eino, 2-53-15-101, Nogata, Nakano-ku, Tokyo (JP); Nobuo Miyaji, Tokyo (JP)

(73) Assignees: Yokogawa Electric Corporation, Tokyo (JP); Takumi Hashizume, Osaka (JP); Tetsuya Wakui, Osaka (JP); Jyun-Ichi Eino, Tokyo (JP)

( * ) Notice: Subject to any disclaimer, the term of this patent is extended or adjusted under 35 U.S.C. 154(b) by 0 days.

(21) Appl. No.: 11/723,855

(22) Filed: Mar. 22, 2007

(65) Prior Publication Data
US 2007/0225924 A1 Sep. 27, 2007

(30) Foreign Application Priority Data
Mar. 27, 2006 (JP) .............................. 2006-084524

(51) Int. Cl.
*G01F 1/34* (2006.01)
*G06F 15/00* (2006.01)
(52) U.S. Cl. ........................................ 702/47; 702/138
(58) Field of Classification Search .................. 702/98, 702/138, 45, 47, 50, 187, 189; 73/706, 707, 73/708; 340/611, 614

See application file for complete search history.

(56) References Cited

U.S. PATENT DOCUMENTS

| 6,654,697 | B1 * | 11/2003 | Eryurek et al. ................. 702/47 |
| 6,907,383 | B2 * | 6/2005 | Eryurek et al. .............. 702/183 |
| 7,260,496 | B2 * | 8/2007 | Hashizume et al. ......... 702/138 |

FOREIGN PATENT DOCUMENTS

| JP | 2004-132817 A | 4/2004 |
| JP | 2004-294175 A | 10/2004 |
| JP | 2005-274501 A | 10/2005 |

\* cited by examiner

*Primary Examiner*—Bryan Bui
(74) *Attorney, Agent, or Firm*—Sughrue Mion, PLLC

(57) ABSTRACT

A detecting apparatus includes the following units. A pressure detecting unit detects in time series higher and lower static pressures and a differential pressure. Fluctuation calculating units calculate time series data sets of a differential pressure fluctuation, a higher static pressure fluctuation, and a lower static pressure fluctuation. Square sum calculating units calculate the square sum of the time series data sets of the differential pressure fluctuation, the square sum of the time series data sets of the higher static pressure fluctuation, and the square sum of the time series data sets of the lower static pressure fluctuation. A correlation coefficient calculating unit calculates first and second correlation coefficients. An intermediate variable calculating unit calculates an intermediate variable. A blockage rate calculating unit calculates a blockage rate. A determination unit determines a blockage of higher and lower pressure impulse lines with reference to the blockage rate.

12 Claims, 3 Drawing Sheets

APPARATUS AND METHOD FOR DETECTING BLOCKAGE OF IMPULSE LINES

BACKGROUND OF THE INVENTION

1. Field of the Invention

The present invention generally relates to an apparatus and method for detecting blockage of impulse lines. More specifically, the present invention relates to an apparatus and method for detecting blockage of impulse lines that are coupled to a differential pressure transmitter, wherein the differential pressure transmitter is configured to measure the differential pressure of a fluid that flows through a tube.

Priority is claimed on Japanese Patent Application No. 2006-84524, filed Mar. 27, 2006, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

It is well-known to a person skilled in the art to which the invention pertains that a differential pressure transmitter can be used to detect the differential pressure between upstream and downstream of an orifice that is provided in a tube. The differential pressure transmitter is coupled to upstream and downstream impulse lines. These upstream and downstream impulse lines are further coupled to the tube at upstream and downstream positions thereof, respectively. The upstream and downstream positions are positioned upstream and downstream of the orifice, respectively. The fluid may have different pressures upstream and downstream of the orifice. The pressure of a fluid upstream of the orifice will hereinafter be referred to as an upstream pressure. The pressure of a fluid downstream of the orifice will hereinafter be referred to as a downstream pressure. In general, the upstream pressure is higher than the downstream pressure. Thus, the upstream and downstream impulse lines may also be referred to as higher and lower pressure impulse lines, respectively.

The upstream and downstream impulse lines are respectively configured to allow the upstream and downstream pressures to travel from the tube to the differential pressure transmitter. The differential pressure transmitter is configured to measure the traveled upstream and downstream pressures so as to detect the differential pressure based on the measured upstream and downstream pressures.

A blockage of the impulse line or impulse lines can prevent the differential pressure transmitter from accurately detecting the differential pressure. In view of monitoring the fluid in the tube, it is important to detect or diagnose that a blockage is present or absent in the impulse line or impulse lines.

A conventional method of detecting a blockage in the impulse line or impulse lines will be described. It is assumed that Dps(i) represents data sets that are related to differential pressure in the normal state in which the impulse lines are free from any blockage. These differential pressure data sets are obtainable in time series from the differential pressure transmitter. The differential pressure has fluctuations Fdps(i) that are given by the following equation (1), where Dps(i) is the current differential pressure data set that is currently obtained from the differential pressure transmitter, and Dps(i−1) is the last differential pressure data set that was last obtained from the differential pressure transmitter. The differential pressure fluctuations Fdps(i) have a variance Vas (root mean square) that is given by the following equation (2), where N is the total sample number of the differential pressure data sets Dps. The variance Vas that is previously found before the diagnosis is made will hereinafter be referred to as "standard fluctuation variance".

$$Fdps(i)=Dps(i)-Dps(i-1) \quad (1)$$

$$Vas=\Sigma\{Fdps(i)^2\}/N \quad (2)$$

The differential pressure fluctuation Fdps(i) and the fluctuation variance Va are determined based on the differential pressure data sets Dps(i) every time the impulse lines are diagnosed during the actual operation of the plant. The above-mentioned equations (1) and (2) can be used to determine the differential pressure fluctuations Fdps(i) and the fluctuation variance Va, respectively.

The square root $(D'=\sqrt{(Va/Vas)})$ of a ratio of the fluctuation variance Va to the standard fluctuation variance Vas will be introduced. This value $D'=\sqrt{(Va/Vas)}$ can be calculated, where the standard fluctuation variance Vas is previously obtained before the diagnosis is made, and the fluctuation variance Va is obtained at the time of diagnosing the impulse lines. The fluctuation variance Va depends on a blockage of the impulse line or impulse lines. This means that the value $D'=\sqrt{(Va/Vas)}$ also depends on a blockage of the impulse line or impulse lines. Thus, a blockage of the impulse line or impulse lines can be detected by detecting the value $D'=\sqrt{(Va/Vas)}$.

For example, if both the higher and lower pressure impulse lines have a blockage, then the fluctuation variance Va of the differential pressure becomes smaller than the standard fluctuation variance Vas and also the value $D'=\sqrt{(Va/Vas)}$ becomes smaller than 1. If either the higher or lower pressure impulse line has a blockage, then the fluctuation variance Va becomes larger than the standard fluctuation variance Vas and also the value $D'=\sqrt{(Va/Vas)}$ becomes larger than 1. If both the higher and lower pressure impulse lines are free of any blockage, then the fluctuation variance Va approaches the standard fluctuation variance Vas and the value $D'=\sqrt{(Va/Vas)}$ approaches 1. By comparing the value $D'=\sqrt{(Va/Vas)}$ to the predetermined threshold, for example, 1, it can be determined whether both or either one of the higher and lower pressure impulse lines have a blockage or the both lines are free of any blockage.

Instead of the above-mentioned equation (1), the following equation (3) can be used to find the differential pressure fluctuation. In case of using the above-described equation (1), the calculated differential pressure fluctuation may reflect a transitional variation component of the differential pressure. The transitional variation may be rising and dropping of the differential pressure.

$$Fdps(i)=Dps(i)-2Dps(i-1)+Dps(i-2) \quad (3)$$

However, in case of using the last-mentioned equation (3), the calculated differential pressure fluctuation is free from the transitional variation component of the differential pressure.

Meanwhile, the variance of the differential pressure fluctuations may vary depending on not only blockage of the impulse lines but also the flow rate of a fluid in the tube. The above-described standard fluctuation variance Vas is an experimental value that is measured at a predetermined or fixed flow rate of the fluid in the tube. During the actual operation of the plant, variation in the flow rate of the fluid may cause variation of the above value $D'=\sqrt{(Va/Vas)}$. However, this variation is independent of the blockage rate of the impulse line or impulse lines. This means that the above-described threshold and the standard fluctuation variance should be set by taking into account the flow rate of the fluid. In other words, to avoid a blockage misdiagnosis it is necessary to update the above-described threshold and the standard fluctuation variance based on variation in the flow rate of the fluid.

There has been developed another conventional technique to correctly detect or diagnose a blockage of the impulse line or impulse lines. This detection or diagnosis is made independently of the flow rate of the fluid. The higher static pressure fluctuations Fsph(i) are calculated in accordance with the following equation (4) by using data sets Sph(i) related to the higher static pressure of a fluid. The higher static pressure is the static pressure of a fluid upstream of the orifice. The higher static pressure data sets Sph(i) are obtainable in time series from the differential pressure transmitter. Also, the lower static pressure fluctuations Fspl(i) are calculated in accordance with the following equation (5) by using other data sets Spl(i) related to the lower static pressure. The lower static pressure is the static pressure of a fluid downstream of the orifice. The lower static pressure data sets Spl(i) are also obtainable in time series from the differential pressure transmitter.

$$Fsph(i)=Sph(i)-Sph(i-1) \qquad (4)$$

$$Fspl(i)=Spl(i)-Spl(i-1) \qquad (5)$$

Subsequently, the sum of squares (Ssph) of the higher static pressure fluctuations Fsph(i) is calculated in accordance with the following equation (6). The other sum of squares (Sspl) of the lower static pressure fluctuations Fspl(i) is calculated in accordance with the following equation (7).

$$Ssph=\Sigma\{Fsph(i)^2\} \qquad (6)$$

$$Sspl=\Sigma\{Fspl(i)^2\} \qquad (7)$$

There is hereby introduced a ratio (D=Ssph/Sspl) of the sum of squares (Ssph) of the higher static pressure fluctuations Fsph(i) to the sum of squares (Sspl) of the lower static pressure fluctuations Fspl(i). This ratio (D=Ssph/Sspl) depends on a blockage of the impulse line or impulse lines. Thus, a blockage of the impulse line or impulse lines can be detected by detecting the ratio (D=Ssph/Sspl).

If the higher pressure impulse line is completely blocked, then the calculated value (Ssph) shall theoretically be equal to zero, and the other calculated value (Sspl) shall theoretically be a predetermined threshold as a non-zero value. Thus, the ratio (D=Ssph/Sspl) shall also be equal to zero. Actually, however, the differential pressure transmitter generates a noise-containing output signal. The noise of the output signal may cause the ratio (D=Ssph/Sspl) to be a non-zero value, for example, approximately 0.05.

If the lower pressure impulse line is completely blocked, then the calculated value (Sspl) should theoretically be equal to zero, and the other calculated value (Ssph) shall theoretically be a predetermined threshold as a non-zero value. Thus, the ratio (D=Ssph/Sspl) shall theoretically be infinite. Actually, however, the output signal noise may cause the ratio (D=Ssph/Sspl) to be a non-infinite value, for example, approximately 20. If both the higher and lower pressure impulse lines are free of any blockage, then both the calculated values (Ssph) and (Sspl) are close to each other. Thus, the ratio (D=Ssph/Sspl) shall be close to 1. Accordingly, by detecting the ratio (D=Ssph/Sspl), it can be determined which impulse line is blocked or both the impulse lines are not blocked.

If the flow rate of a fluid in the tube is increased, then both the calculated values (Ssph) and (Sspl) are also increased together. Also, if the flow rate is decreased, then both the calculated values (Ssph) and (Sspl) are also decreased together. Thus, the ratio (D=Ssph/Sspl) is independent of the flow rate. It is possible to accurately detect or diagnose a blockage of the impulse line or impulse lines independently of the flow rate of the fluid in the tube. The higher and lower static pressure fluctuations Fsph(i) and Fspl(i) can be determined in the same manner as described above.

The above-described and other technical backgrounds are disclosed in Japanese Unexamined Patent Applications, First Publications, No. 2004-132817, No. 2004-294175, and No. 2005-274501.

As described above, the second conventional technique can be used to accurately detect or diagnose a blockage of the impulse line or impulse lines independently of the flow rate of a fluid in a tube. The second conventional technique makes it difficult to set a threshold that is compared to the ratio (D=Ssph/Sspl).

If the higher pressure impulse line is completely blocked, the actual ratio (D=Ssph/Sspl) is approximately 0.05. If the lower pressure impulse line is completely blocked, the actual ratio (D=Ssph/Sspl) is approximately 20. If both the higher pressure impulse lines are not blocked, then the actual ratio (D=Ssph/Sspl) is nearly equal to 1. Thus, the threshold can be set 1. In this case, if the actual ratio (D=Ssph/Sspl) is less than 1, then it is determined that the higher pressure impulse line is blocked while the lower pressure impulse line is not blocked. If the actual ratio (D=Ssph/Sspl) is more than 1, then it is determined that the lower pressure impulse line is blocked while the higher pressure impulse line is not blocked.

In other words, if the higher pressure impulse line is blocked, then the actual ratio (D=Ssph/Sspl) is in a wider range of $1<D\leq20$. If the lower pressure impulse line is blocked, then the actual ratio (D=Ssph/Sspl) is in a narrower range of $0.05\leq D<1$. The determination range indicating that the higher impulse line is blocked is different in width from the other determination range indicating that the lower impulse line is blocked. This makes it inconvenient and difficult for a user to set the threshold.

In view of the above, it will be apparent to those skilled in the art from this disclosure that there exists a need for an improved apparatus and/or method. This invention addresses this need in the art as well as other needs, which will become apparent to those skilled in the art from this disclosure.

SUMMARY OF THE INVENTION

Accordingly, it is a primary object of the present invention to provide an apparatus for detecting a blockage of an impulse line or impulse lines.

It is another object of the present invention to provide an apparatus for detecting a blockage of an impulse line or impulse lines, wherein the apparatus is free from the disadvantages described above.

It is a further object of the present invention to provide an apparatus configured to allow a user to conformably and conveniently set a threshold to be used in detecting a blockage of an impulse line or impulse lines.

It is a still further object of the present invention to provide a method of detecting a blockage of an impulse line or impulse lines.

It is yet a further object of the present invention to provide a method of detecting a blockage of an impulse line or impulse lines, wherein the method is free from the disadvantages described above.

It is an additional object of the present invention to provide a method of allowing a user to conformably and conveniently set a threshold to be used in detecting a blockage of an impulse line or impulse lines.

In accordance with a first aspect of the present invention, an apparatus for detecting a blockage of impulse line may include, but is not limited to, a pressure detecting unit, a first fluctuation calculating unit, a second fluctuation calculating unit, a third fluctuation calculating unit, a first square sum calculating unit, a second square sum calculating unit, a third square sum calculating unit, a correlation coefficient calculating unit, an intermediate variable calculating unit, a blockage rate calculating unit, and a determination unit. The pressure detecting unit may be configured to detect in time series a higher static pressure that travels through a higher pressure impulse line and generate time series data sets of the higher static pressure. The pressure detecting unit may be configured to detect in time series a lower static pressure that travels through a lower pressure impulse line and generate time series data sets of the lower static pressure. The pressure detecting unit may also be configured to detect in time series a differential pressure between the higher and lower pressure impulse lines and generate time series data sets of the differential pressure. The first fluctuation calculating unit may be configured to calculate time series data sets of a differential pressure fluctuation based on the time series data sets of the differential pressure. The second fluctuation calculating unit may be configured to calculate time series data sets of a higher static pressure fluctuation based on the time series data sets of the higher static pressure. The third fluctuation calculating unit may be configured to calculate time series data sets of a lower static pressure fluctuation based on the time series data sets of the lower static pressure. The first square sum calculating unit may be configured to calculate the square sum of the time series data sets of the differential pressure fluctuation. The second square sum calculating unit may be configured to calculate the square sum of the time series data sets of the higher static pressure fluctuation. The third square sum calculating unit may be configured to calculate the square sum of the time series data sets of the lower static pressure fluctuation. The correlation coefficient calculating unit may be configured to calculate a first correlation coefficient based on the time series data sets of the differential pressure fluctuation, the time series data sets of the higher static pressure fluctuation, the square sum of the time series data sets of the differential pressure fluctuation, and the square sum of the time series data sets of the higher static pressure fluctuation. The correlation coefficient calculating unit may also be configured to calculate a second correlation coefficient based on the time series data sets of the differential pressure fluctuation, the time series data sets of the lower static pressure fluctuation, the square sum of the time series data sets of the differential pressure fluctuation, and the square sum of the time series data sets of the lower static pressure fluctuation. The intermediate variable calculating unit may be configured to calculate an intermediate variable based on the first and second correlation coefficients. The blockage rate calculating unit may be configured to calculate a blockage rate based on the intermediate variable. The determination unit may be configured to determine a blockage of each of the higher and lower pressure impulse lines with reference to the blockage rate.

In accordance with a second aspect of the present invention, an apparatus for detecting a blockage of impulse line may include, but is not limited to, a pressure detecting unit, a first fluctuation calculating unit, a second fluctuation calculating unit, a first square sum calculating unit, a second square sum calculating unit, a ratio calculating unit, a blockage rate calculating unit, and a determination unit. The pressure detecting unit may be configured to detect in time series a higher static pressure that travels through a higher pressure impulse line and generate time series data sets of the higher static pressure. The pressure detecting unit may also be configured to detect in time series a lower static pressure that travels through a lower pressure impulse line and generate time series data sets of the lower static pressure. The first fluctuation calculating unit may be configured to calculate time series data sets of a higher static pressure fluctuation based on the time series data sets of the higher static pressure. The second fluctuation calculating unit may be configured to calculate time series data sets of a lower static pressure fluctuation based on the time series data sets of the lower static pressure. The first square sum calculating unit may be configured to calculate the square sum of the time series data sets of the higher static pressure fluctuation. The second square sum calculating unit may be configured to calculate the square sum of the time series data sets of the lower static pressure fluctuation. The ratio calculating unit may be configured to calculate a ratio of the square sum of the time series data sets of the higher static pressure fluctuation to the square sum of the time series data sets of the lower static pressure fluctuation. The blockage rate calculating unit may be configured to calculate a blockage rate based on the ratio. The determination unit may be configured to determine a blockage of each of the higher and lower pressure impulse lines with reference to the blockage rate.

In accordance with a third aspect of the present invention, a method of detecting a blockage of impulse line may include, but is not limited to, the following processes. A higher static pressure that travels through a higher pressure impulse line may be detected in time series to generate time series data sets of the higher static pressure. A lower static pressure that travels through a lower pressure impulse line is detected in time series to generate time series data sets of the lower static pressure. A differential pressure between the higher and lower pressure impulse lines is detected in time series to generate time series data sets of the differential pressure. Time series data sets of a differential pressure fluctuation are calculated based on the time series data sets of the differential pressure. Time series data sets of a higher static pressure fluctuation are calculated based on the time series data sets of the higher static pressure. Time series data sets of a lower static pressure fluctuation are calculated based on the time series data sets of the lower static pressure. The square sum of the time series data sets of the differential pressure fluctuation is calculated. The square sum of the time series data sets of the higher static pressure fluctuation is calculated. The square sum of the time series data sets of the lower static pressure fluctuation is calculated. A first correlation coefficient is calculated based on the time series data sets of the differential pressure fluctuation, the time series data sets of the higher static pressure fluctuation, the square sum of the time series data sets of the differential pressure fluctuation, and the square sum of the time series data sets of the higher static pressure fluctuation. A second correlation coefficient is calculated based on the time series data sets of the differential pressure fluctuation, the time series data sets of the lower static pressure fluctuation, the square sum of the time series data sets of the differential pressure fluctuation, and the square sum of the time series data sets of the lower static pressure fluctuation. An intermediate variable is calculated based on the first and second correlation coefficients. A blockage rate is calculated based on the intermediate variable. A blockage of each of the higher and lower pressure impulse lines is determined with reference to the blockage rate.

In accordance with a fourth aspect of the present invention, a method of detecting a blockage of impulse line may include, but is not limited to, the following processes. A higher static pressure that travels through a higher pressure impulse line is detected in time series to generate time series data sets of the higher static pressure. A lower static pressure that travels through a lower pressure impulse line is detected in time series to generate time series data sets of the lower static pressure. Time series data sets of a higher static pressure fluctuation are calculated based on the time series data sets of the higher static pressure. Time series data sets of a lower static pressure fluctuation are calculated based on the time series data sets of the lower static pressure. The square sum of the time series data sets of the higher static pressure fluctuation is calculated. The square sum of the time series data sets of the lower static pressure fluctuation is calculated. A ratio of the square sum of the time series data sets of the higher static pressure fluctuation to the square sum of the time series data sets of the lower static pressure fluctuation is calculated. A blockage rate is calculated based on the ratio. A blockage of each of the higher and lower pressure impulse lines is determined with reference to the blockage rate.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure.

DETAILED DESCRIPTION OF THE INVENTION

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
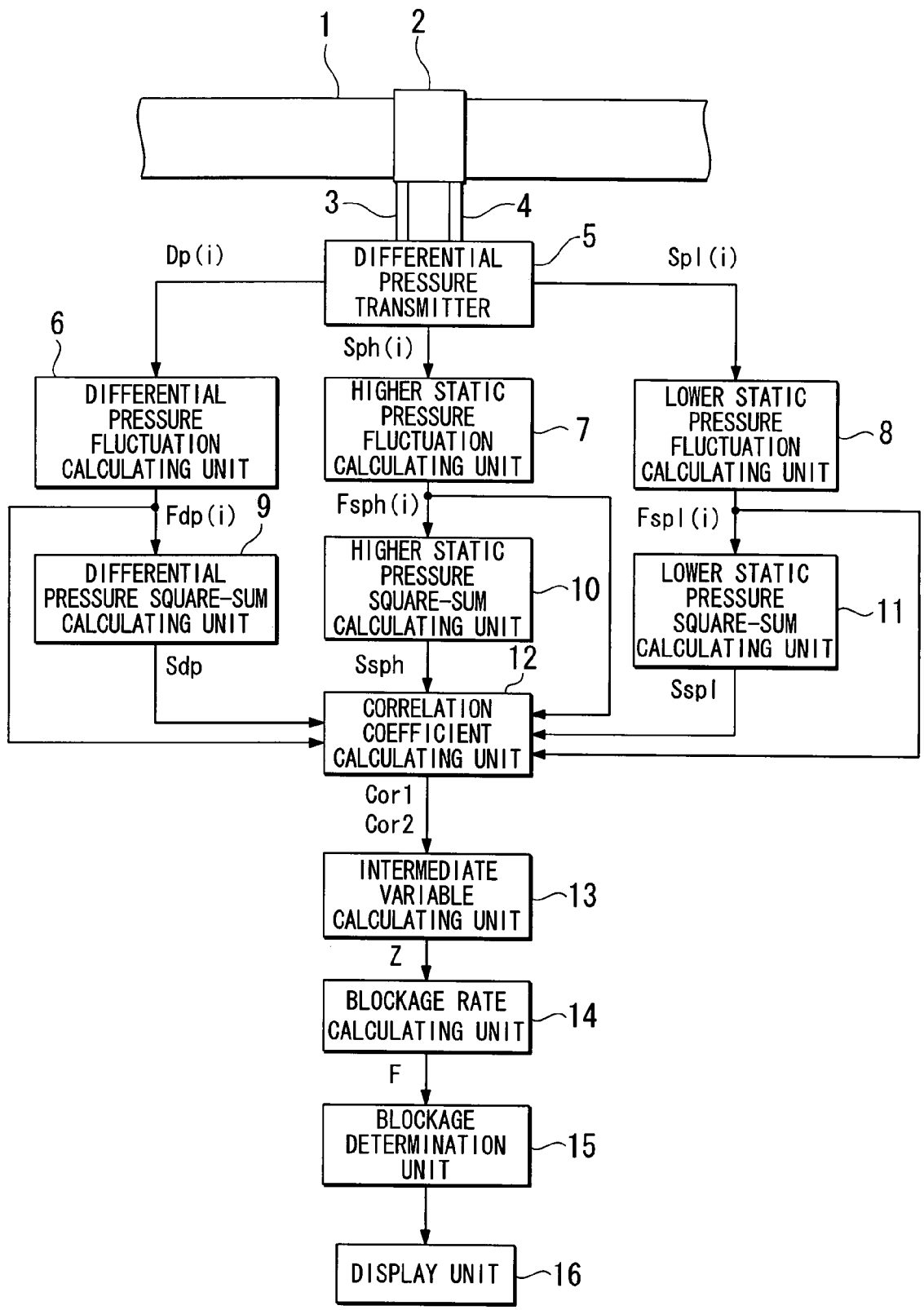
FIG. 1 is a schematic view illustrating an apparatus for detecting a blockage of impulse lines in accordance with a first embodiment of the present invention.

FIG. 1 is a schematic view illustrating an apparatus for detecting a blockage of impulse lines in accordance with a first embodiment of the present invention. The detecting apparatus is configured to detect a blockage of higher and lower pressure impulse lines 3 and 4. The higher and lower pressure impulse lines 3 and 4 are coupled to a tube 1 upstream and downstream of an orifice 2, respectively, wherein the tube 1 is configured to allow a fluid to flow in a direction from the lift side to the right side through the orifice 2 of the drawing of FIG. 1. The higher and lower pressure impulse lines 3 and 4 may be referred to as upstream and downstream impulse lines.

The detecting apparatus may include, but is not limited to, a differential pressure transmitter 5, a differential pressure fluctuation calculating unit 6, a higher static pressure fluctuation calculating unit 7, a lower static pressure fluctuation calculating unit 8, a differential pressure square-sum calculating unit 9, a higher static pressure square-sum calculating unit 10, a lower static pressure square-sum calculating unit 11, a correlation coefficient calculating unit 12, an intermediate variable calculating unit 13, a blockage rate calculating unit 14, a blockage determination unit 15, and a display unit 16.

The differential pressure transmitter 5 is configured to detect the differential pressure between upstream and downstream pressures that have traveled through the higher and lower pressure impulse lines 3 and 4 from the tube 1. The upstream and downstream pressures are pressures upstream and downstream of the orifice 2. For example, the differential pressure transmitter 5 may be coupled to the higher and lower pressure impulse lines 3 and 4. The differential pressure transmitter 5 may further include, but is not limited to, first and second sensors. The first and second sensors are configured to detect higher and lower static pressures that have traveled through the higher and lower pressure impulse lines 3 and 4 from the tube 1, respectively. The first and second sensors are not illustrated. The first and second sensors may be realized by, but not limited to, resonant sensors. The differential pressure transmitter 5 is configured to detect the differential pressure based on the detected higher and lower pressures. The differential pressure transmitter 5 may also be configured to generate and output in time series differential pressure data sets Dp(i). The differential pressure data set Dp(i) indicates the detected differential pressure. The differential pressure transmitter 5 may also be configured to generate and output in time series higher and lower static pressure data sets Sph(i) and Spl(i). The higher and lower static pressure data sets Sph(i) and Spl(i) indicate the detected higher and lower static pressures, respectively.

The differential pressure fluctuation calculating unit 6 may be functionally coupled to the differential pressure transmitter 5 to receive in time series the differential pressure data sets Dp(i) from the differential pressure transmitter 5. The differential pressure fluctuation calculating unit 6 may be configured to calculate in time series differential pressure fluctuations Fdp(i) based on the differential pressure data sets Dp(i) in accordance with the following equation (8), where Dp(i) is the current differential pressure data set that is currently obtained from the differential pressure transmitter 5, and Dps(i−1) is the last differential pressure data set that was last obtained from the differential pressure transmitter 5.

$$Fdp(i)=Dp(i)-Dp(i-1) \quad (8)$$

The higher static pressure fluctuation calculating unit 7 may be functionally coupled to the differential pressure transmitter 5 to receive in time series the higher static pressure data sets Sph(i) from the differential pressure transmitter 5. The higher static pressure fluctuation calculating unit 7 may be configured to calculate in time series higher static pressure fluctuations Fsph(i) based on the higher static pressure data sets Sph(i) in accordance with the above-mentioned equation (4).

The lower static pressure fluctuation calculating unit 8 may be functionally coupled to the differential pressure transmitter 5 to receive in time series the lower static pressure data sets Spl(i) from the differential pressure transmitter 5. The lower static pressure fluctuation calculating unit 8 may be configured to calculate in time series lower static pressure fluctuations Fspl(i) based on the lower static pressure data sets Spl(i) in accordance with the above-mentioned equation (5).

The differential pressure square-sum calculating unit 9 may be functionally coupled to the differential pressure fluctuation calculating unit 6 to receive in time series the differential pressure fluctuations Fdp(i) from the differential pressure fluctuation calculating unit 6. The differential pressure square-sum calculating unit 9 may be configured to calculate a square sum Sdp of the differential pressure fluctuations Fdp(i) in accordance with the following equation (9).

$$Sdp=\Sigma\{Fdp(i)^2\} \quad (9)$$

The higher static pressure square-sum calculating unit 10 may be functionally coupled to the higher static pressure fluctuation calculating unit 7 to receive in time series the higher static pressure fluctuations Fsph(i) from the higher static pressure fluctuation calculating unit 7. The higher static pressure square-sum calculating unit 10 may be configured to calculate a square sum Ssph of the higher static pressure fluctuations Fsph(i) in accordance with the above-mentioned equation (6).

The lower static pressure square-sum calculating unit 11 may be functionally coupled to the lower static pressure fluctuation calculating unit 8 to receive in time series the lower static pressure fluctuations Fspl(i) from the lower static pressure fluctuation calculating unit 8. The lower static pressure square-sum calculating unit 11 may be configured to calculate a square sum Sspl of the lower static pressure fluctuations Fspl(i) in accordance with the above-mentioned equation (7).

The correlation coefficient calculating unit 12 may be functionally coupled to the differential pressure fluctuation calculating unit 6 to receive in time series the differential pressure fluctuations Fdp(i) from the differential pressure fluctuation calculating unit 6. The correlation coefficient calculating unit 12 may also be functionally coupled to the higher static pressure fluctuation calculating unit 7 to receive in time series the higher static pressure fluctuations Fsph(i) from the higher static pressure fluctuation calculating unit 7. The correlation coefficient calculating unit 12 may also be functionally coupled to the lower static pressure fluctuation calculating unit 8 to receive in time series the lower static pressure fluctuations Fspl(i) from the lower static pressure fluctuation calculating unit 8. The correlation coefficient calculating unit 12 may also be functionally coupled to the differential pressure square-sum calculating unit 9 to receive the square sum Sdp of the differential pressure fluctuations Fdp(i) from the differential pressure square-sum calculating unit 9. The correlation coefficient calculating unit 12 may also be functionally coupled to the higher static pressure square-sum calculating unit 10 to receive the square sum Ssph of the higher static pressure fluctuations Fsph(i) from the higher static pressure square-sum calculating unit 10. The correlation coefficient calculating unit 12 may also be functionally coupled to the lower static pressure square-sum calculating unit 11 to receive the square sum Sspl of the lower static pressure fluctuations Fspl(i) from the lower static pressure square-sum calculating unit 11.

The correlation coefficient calculating unit 12 may be configured to calculate a first correlation coefficient Cor1 based on the higher static pressure fluctuations Fsph(i), the differential pressure fluctuations Fdp(i), the square sum Ssph, and the square sum Sdp in accordance with the following equation (10). The correlation coefficient calculating unit 12 may also be configured to calculate a second correlation coefficient Cor2 based on the lower static pressure fluctuations Fspl(i), the differential pressure fluctuations Fdp(i), the square sum Sspl, and the square sum Sdp in accordance with the following equation (11).

$$Cor1=\Sigma\{Fsph(i)\cdot Fdp(i)\}/\sqrt{(Ssph\cdot Sdp)} \quad (10)$$

$$Cor2=\Sigma\{Fspl(i)\cdot Fdp(i)\}/\sqrt{(Sspl\cdot Sdp)} \quad (11)$$

The intermediate variable calculating unit 13 may be functionally coupled to the correlation coefficient calculating unit 12 to receive the first and second correlation coefficients Cor1 and Cor2 from the correlation coefficient calculating unit 12. The intermediate variable calculating unit 13 may be configured to calculate an intermediate variable Z based on the first and second correlation coefficients Cor1 and Cor2 in accordance with the following equation (12).

$$Z=(1+Cor2)/(1-Cor1) \quad (12)$$

The blockage rate calculating unit 14 may be functionally coupled to the intermediate variable calculating unit 13 to receive the intermediate variable Z from the intermediate variable calculating unit 13. The blockage rate calculating unit 14 may be configured to calculate a blockage rate F based on the intermediate variable Z in accordance with the following equation (13).

$$F=(1-Z)/(1+Z) \quad (13)$$

The blockage determination unit 15 may be functionally coupled to the blockage rate calculating unit 14 to receive the blockage rate F from the blockage rate calculating unit 14. The blockage determination unit 15 may be configured to compare the blockage rate F to the predetermined thresholds thereby determining whether each of the higher and lower pressure impulse lines 3 and 4 is blocked or not. The blockage determination unit 15 may be configured to generate a determination result that indicates the presence or absence of a blockage in each of the higher and lower pressure impulse lines 3 and 4.

The display unit 16 may be functionally coupled to the blockage determination unit 15 to receive the determination result from the blockage determination unit 15. The display unit 16 may be configured to display the determination result. The display unit 16 may be realized by a known display device such as a liquid crystal display.

Figure 2:
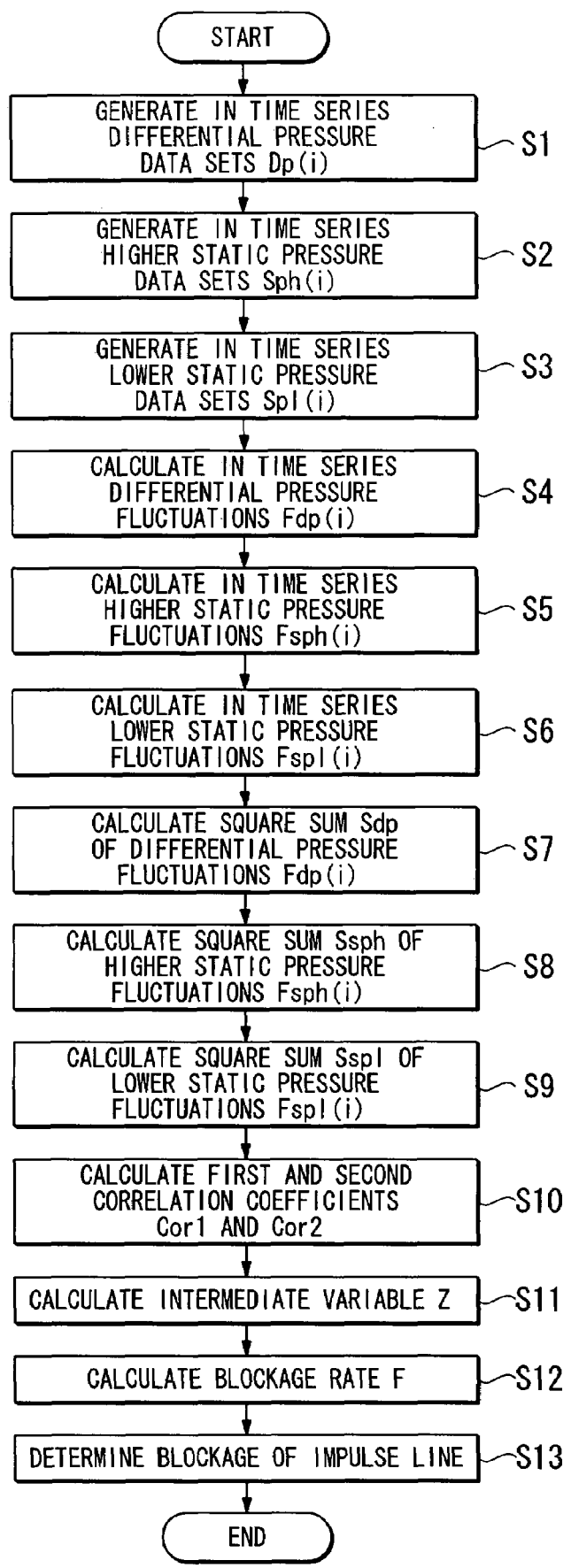
FIG. 2 is a flow chart illustrating sequential steps involved in a method of detecting a blockage in each of the higher and lower pressure impulse lines in accordance with the first embodiment of the present invention.

Operations of the above-described detecting apparatus will be described. FIG. 2 is a flow chart illustrating sequential steps involved in a method of detecting a blockage in each of the higher and lower pressure impulse lines in accordance with the first embodiment of the present invention. The above-described detecting apparatus performs a set of the following processes every time a predetermined diagnostic time has come.

In Step S1, the differential pressure transmitter 5 detects the higher and lower static pressures that have traveled through the higher and lower pressure impulse lines 3 and 4 from the tube 1, respectively. The differential pressure transmitter 5 further detects the differential pressure based on the detected higher and lower pressures, thereby generating and outputting in time series differential pressure data sets Dp(i), each of which indicates the detected differential pressure. The differential pressure transmitter 5 supplies the differential pressure data sets Dp(i) to the differential pressure fluctuation calculating unit 6.

In Step S2, the differential pressure transmitter 5 further generates and outputs in time series the higher static pressure data sets Sph(i), each of which indicates the detected higher static pressure. The differential pressure transmitter 5 supplies the higher static pressure data sets Sph(i) to the higher static pressure fluctuation calculating unit 7.

In Step S3, the differential pressure transmitter 5 further generates and outputs in time series the lower static pressure data sets Spl(i), each of which indicates the detected lower static pressure. The differential pressure transmitter 5 supplies the lower static pressure data sets Spl(i) to the lower static pressure fluctuation calculating unit 8.

Regarding the above-described three steps, additional descriptions will be provided. The differential pressure transmitter 5 may further include the first and second sensors that are configured to detect the higher and lower static pressures that have traveled through the higher and lower pressure impulse lines 3 and 4 from the tube 1, respectively. The first and second sensors may also be realized by resonant sensors. It is assumed that the first and second sensors respectively output frequencies Fc and Fr.

The differential pressure data sets Dp(i) are given by the following equation (14), where Ap is a constant. The constant Ap can be optimized to detect the differential pressure independently from the static pressures. For example, the constant Ap can be set so that application of a static pressure of 0.5 (MPa) causes no variation of the differential pressure data sets Dp(i) under the condition that the differential pressure is equal to 0.

The higher static pressure data sets Sph(i) are also given by the following equation (15), where Ap1 is a constant. The constant Ap1 can be optimized to detect the higher static pressure independently from the differential pressure. For example, the constant Ap1 can be set so that the higher static pressure data sets Sph(i) that are obtained under the condition that no differential pressure is applied are equal to the higher static pressure data sets Sph(i) that are obtained under the condition that a differential pressure of 0.1 (MPa) is applied from the lower pressure side.

The lower static pressure data sets Spl(i) are also given by the following equation (16), where Ap2 is a constant. The constant Ap2 can be optimized to detect the lower static pressure independently from the differential pressure. For example, the constant Ap2 can be set so that the lower static pressure data sets Spl(i) that are obtained under the condition that no differential pressure is applied are equal to the lower static pressure data sets Spl(i) that are obtained under the condition that a differential pressure of 0.1 (MPa) is applied from the higher pressure side.

$$Dp(i)=Fc^2-Ap\cdot Fr^2 \quad (14)$$

$$Sph(i)=Fc^2+Ap1\cdot Fr^2 \quad (15)$$

$$Spl(i)=Fc^2+Ap2\cdot Fr^2 \quad (16)$$

In Step S4, the differential pressure fluctuation calculating unit 6 receives in time series the differential pressure data sets Dp(i) from the differential pressure transmitter 5. The differential pressure fluctuation calculating unit 6 calculates in time series the differential pressure fluctuations Fdp(i) based on the differential pressure data sets Dp(i) in accordance with the above-described equation (8). The differential pressure fluctuation calculating unit 6 supplies the differential pressure fluctuations Fdp(i) to the differential pressure square-sum calculating unit 9 and the correlation coefficient calculating unit 12.

In Step S5, the higher static pressure fluctuation calculating unit 7 receives in time series the higher static pressure data sets Sph(i) from the differential pressure transmitter 5. The higher static pressure fluctuation calculating unit 7 calculates in time series the higher static pressure fluctuations Fsph(i) based on the higher static pressure data sets Sph(i) in accordance with the above-mentioned equation (4). The higher static pressure fluctuation calculating unit 7 supplies the higher static pressure fluctuations Fsph(i) to the higher static pressure square-sum calculating unit 10 and the correlation coefficient calculating unit 12.

In Step S6, the lower static pressure fluctuation calculating unit 8 receives in time series the lower static pressure data sets Spl(i) from the differential pressure transmitter 5. The lower static pressure fluctuation calculating unit 8 calculates in time series the lower static pressure fluctuations Fspl(i) based on the lower static pressure data sets Spl(i) in accordance with the above-mentioned equation (5). The lower static pressure fluctuation calculating unit 8 supplies the lower static pressure fluctuations Fspl(i) to the lower static pressure square-sum calculating unit 11 and the correlation coefficient calculating unit 12.

In Step S7, the differential pressure square-sum calculating unit 9 receives in time series the differential pressure fluctuations Fdp(i) from the differential pressure fluctuation calculating unit 6. The differential pressure square-sum calculating unit 9 calculates the square sum Sdp of the differential pressure fluctuations Fdp(i) in accordance with the above-mentioned equation (9). The differential pressure square-sum calculating unit 9 supplies the square sum Sdp of the differential pressure fluctuations Fdp(i) to the correlation coefficient calculating unit 12.

In Step S8, the higher static pressure square-sum calculating unit 10 receives in time series the higher static pressure fluctuations Fsph(i) from the higher static pressure fluctuation calculating unit 7. The higher static pressure square-sum calculating unit 10 calculates the square sum Ssph of the higher static pressure fluctuations Fsph(i) in accordance with the above-mentioned equation (6). The higher static pressure square-sum calculating unit 10 supplies the square sum Ssph of the higher static pressure fluctuations Fsph(i) to the correlation coefficient calculating unit 12.

In Step S9, the lower static pressure square-sum calculating unit 11 receives in time series the lower static pressure fluctuations Fspl(i) from the lower static pressure fluctuation calculating unit 8. The lower static pressure square-sum calculating unit 11 calculates the square sum Sspl of the lower static pressure fluctuations Fspl(i) in accordance with the above-mentioned equation (7). The lower static pressure square-sum calculating unit 11 supplies the square sum Sspl of the lower static pressure fluctuations Fspl(i) to the correlation coefficient calculating unit 12.

In Step S10, the correlation coefficient calculating unit 12 receives in time series the differential pressure fluctuations Fdp(i) from the differential pressure fluctuation calculating unit 6. The correlation coefficient calculating unit 12 also receives in time series the higher static pressure fluctuations Fsph(i) from the higher static pressure fluctuation calculating unit 7. The correlation coefficient calculating unit 12 also receives in time series the lower static pressure fluctuations Fspl(i) from the lower static pressure fluctuation calculating unit 8. The correlation coefficient calculating unit 12 also receives the square sum Sdp of the differential pressure fluctuations Fdp(i) from the differential pressure square-sum calculating unit 9. The correlation coefficient calculating unit 12 also be receives the square sum Ssph of the higher static pressure fluctuations Fsph(i) from the higher static pressure square-sum calculating unit 10. The correlation coefficient calculating unit 12 also receives the square sum Sspl of the lower static pressure fluctuations Fspl(i) from the lower static pressure square-sum calculating unit 11.

The correlation coefficient calculating unit 12 calculates the first correlation coefficient Cor1 based on the higher static pressure fluctuations Fsph(i), the differential pressure fluctuations Fdp(i), the square sum Ssph, and the square sum Sdp in accordance with the above-mentioned equation (10). The correlation coefficient calculating unit 12 calculates the second correlation coefficient Cor2 based on the lower static pressure fluctuations Fspl(i), the differential pressure fluctuations Fdp(i), the square sum Sspl, and the square sum Sdp in accordance with the above-described equation (11). The correlation coefficient calculating unit 12 supplies the first and second correlation coefficients Cor1 and Cor2 to the intermediate variable calculating unit 13.

Since the differential pressure is equal to the difference between the high and low static pressures, the differential pressure fluctuation Fdp(i) is given by the difference between the higher static pressure fluctuation Fsph(i) and the lower static pressure fluctuation Fspl(i). If the lower pressure impulse line 4 is blocked, then the differential pressure fluctuation Fdp(i) approaches the higher static pressure fluctuations Fsph(i), and the square sum Sdp of the differential pressure fluctuations Fdp(i) approaches the square sum Ssph of the higher static pressure fluctuations Fsph(i). Namely, the numerator of the above-mentioned equation (10) approaches the square sum of the higher static pressure fluctuations Fsph(i), while the denominator of the above-mentioned equation (10) approaches the square sum Ssph. The first correlation coefficient Cor1 approaches 1.

If the higher pressure impulse line 3 is blocked, then the differential pressure fluctuation Fdp(i) approaches the lower static pressure fluctuations Fspl(i), and the square sum Sdp of the differential pressure fluctuations Fdp(i) approaches the square sum Sspl of the lower static pressure fluctuations Fspl(i). Namely, the numerator of the above-mentioned equation (11) approaches the square sum (negative sign) of the lower static pressure fluctuations Fspl(i), while the denominator of the above-mentioned equation (11) approaches the square sum Sspl. The second correlation coefficient Cor2 approaches −1.

Consequently, if the lower pressure impulse line 4 is blocked, then the first correlation coefficient Cor1 approaches 1. If the higher pressure impulse line 3 is blocked, then the second correlation coefficient Cor2 approaches −1. If both the higher and lower pressure impulse lines 3 and 4 are free of any blockage, then the first and second correlation coefficients Cor1 and Cor2 are approximately 0.

In Step S11, the intermediate variable calculating unit 13 receives the first and second correlation coefficients Cor1 and Cor2 from the correlation coefficient calculating unit 12. The intermediate variable calculating unit 13 calculates the intermediate variable Z based on the first and second correlation coefficients Cor1 and Cor2 in accordance with the above-mentioned equation (12). The intermediate variable calculating unit 13 supplies the intermediate variable Z to the blockage rate calculating unit 14.

As described above, if the lower pressure impulse line 4 is blocked, then the first correlation coefficient Cor1 approaches 1, whereby the intermediate variable Z approaches infinity. If the higher pressure impulse line 3 is blocked, then the second correlation coefficient Cor2 approaches −1, whereby the intermediate variable Z approaches 0. If both the higher and lower pressure impulse lines 3 and 4 are free of any blockage, then the first and second correlation coefficients Cor1 and Cor2 are approximately 0, whereby the intermediate variable Z approaches 1. Namely, the intermediate variable Z varies in the range from 0 to infinity.

In Step S12, the blockage rate calculating unit 14 receives the intermediate variable Z from the intermediate variable calculating unit 13. The blockage rate calculating unit 14 calculates the blockage rate F based on the intermediate variable Z in accordance with the above-mentioned equation (13). The blockage rate calculating unit 14 supplies the blockage rate F to the blockage determination unit 15. As can be seen from the above-mentioned equation (13), if the lower pressure impulse line 14 is blocked, then the intermediate variable Z approaches infinity, whereby the blockage rate F approaches −1. If the higher pressure impulse line 13 is blocked, then the intermediate variable Z approaches 0, whereby the blockage rate F approaches 1. If both the higher and lower pressure impulse lines 3 and 4 are free of any blockage, then the intermediate variable Z approaches 1, whereby the blockage rate F approaches 0. Namely, the blockage rate F is normalized within the range of −1 to +1 in accordance with the above-mentioned equation (13).

Figure 3:
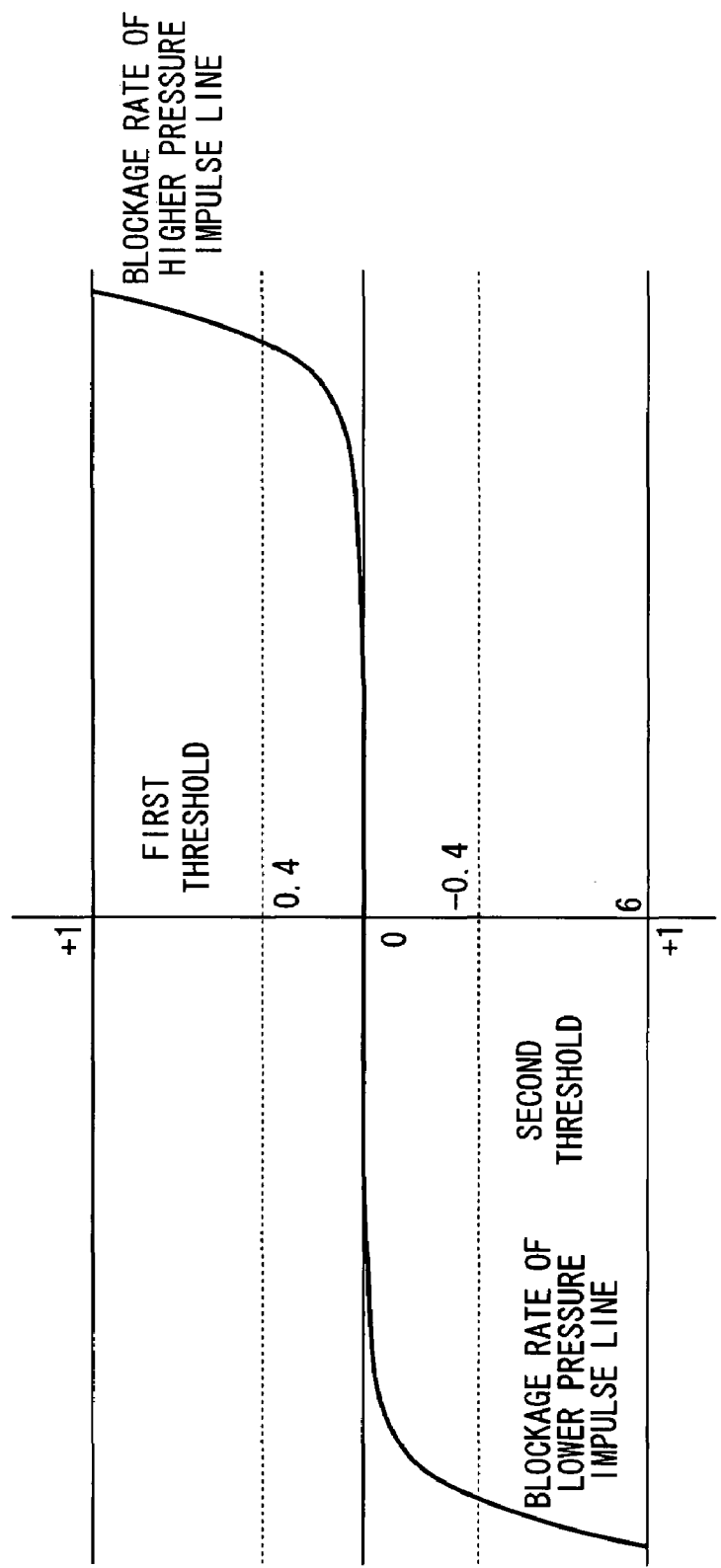
FIG. 3 is a diagram illustrating the characteristic curve of a blockage rate which is calculated by the blockage rate calculating unit included in the detecting apparatus shown in FIG. 1.

FIG. 3 is a diagram illustrating the characteristic curve of a blockage rate F which is calculated by the blockage rate calculating unit 14 included in the detecting apparatus shown in FIG. 1. If both the higher and lower pressure impulse lines 3 and 4 are free of any blockage, then the blockage rate F is 0. The characteristic curve of the blockage rate F has a rotational symmetry with reference to the origin of 0. The characteristic curve of the blockage rate F has first and second parts. The first part represents the blockage rate F for the higher pressure impulse line 3 and extends in the range of 0 to +1. The second part represents the blockage rate F for the lower pressure impulse line 4 and extends in the range of 0 to −1. A first threshold is given to determine a blockage of the higher pressure impulse line 3. The first threshold is a positive value. A second threshold is also given to determine a blockage of the lower pressure impulse line 4. The second threshold is a negative value. The first and second thresholds have the same absolute value and the opposite signs. Typical examples of the first and second thresholds are +0.4 and −0.4, respectively. This means it is necessary to determine the same absolute value of the first and second thresholds. In other words, it is necessary to determine one of the first and second thresholds, because another has the sign opposing the determined one and the same absolute value as the determined one. The above-described method is efficient and convenient to determine the first and second thresholds as compared to when the ratio (D=Ssph/Sspl) is used to determine a blockage of impulse lines.

In Step S13, the blockage determination unit 15 receives the blockage rate F from the blockage rate calculating unit 14. The blockage determination unit 15 compares the blockage rate F to the predetermined thresholds thereby determining whether each of the higher and lower pressure impulse lines 3 and 4 is blocked or not. The blockage determination unit 15 generates the determination result that indicates the presence or absence of a blockage in each of the higher and lower pressure impulse lines 3 and 4.

If the first threshold is set +0.4, then the second threshold is automatically set −0.4. In this case, if the blockage rate F satisfies $0.4 \leq F \leq 1$, then the blockage determination unit 15 determines that the higher pressure impulse line 3 is blocked. If the blockage rate F satisfies $-1 \leq F \leq -0.4$, then the blockage determination unit 15 determines that the lower pressure impulse line 4 is blocked. If the blockage rate F satisfies $-0.4 < F < +0.4$, then the blockage determination unit 15 determines that the higher and lower pressure impulse lines 3 and 4 are free of any blockage.

The display unit 16 receives the determination result from the blockage determination unit 15 and displays the determination result that indicates a blockage of the higher and lower pressure impulse lines 3 and 4.

The above-described detecting apparatus and method permit a user or an operator to set thresholds easily as compared to the above-described conventional apparatus.

If the flow rate of the fluid increases, then the numerator and the denominator of the above-mentioned equation (10) increase at the same rate, whereby the first correlation coefficient Cor1 remains unchanged. Also, the numerator and the denominator of the above-mentioned equation (11) increase at the same rate, whereby the second correlation coefficient Cor2 remains unchanged. The above-described detecting apparatus accurately detects a blockage of each of the higher and lower pressure impulse lines 3 and 4, independently of the flow rate of the fluid in the tube.

The above-described detecting apparatus and method is independent of or has a reduced dependency on noises of the output signal from the differential pressure transmitter 5 that include the resonant sensors. In other words, the above-described detecting apparatus and method ensures high sensitivity for the reasons as follows. The differential pressure fluctuation Fdp(i) is given by the difference between the higher static pressure fluctuation Fsph(i) and the lower static pressure fluctuation Fspl(i). It is hereby assumed that the higher and lower static pressure fluctuations Fsph(i) and Fspl(i) have noise components Nsph(i) and Nspl(i), respectively. The numerator of the above-mentioned equation (10) is given by the following equation (17).

$$\Sigma\{Fsph(i)*Fdp(i)\}=\Sigma[\{Fsph(i)+Nsph(i)\}\cdot\{Fsph(i)-Fspl(i)+Nsph(i)-Nspl(i)\}] \quad (17)$$

It should be noted that the higher static pressure fluctuation Fsph(i) and the noise component Nsph(i) are independent from each other. The total sum of the products of the lower static pressure fluctuations Fspl(i) and the noise components Nspl(i) may approximately be 0. The lower static pressure fluctuation Fspl(i) and the noise component Nspl(i) are also independent from each other. The total sum of the products of the lower static pressure fluctuations Fspl(i) and the noise components Nspl(i) may approximately be 0. The noise component Nsph(i) and the higher static pressure fluctuation Fsph(i) are also independent from each other. The total sum of the products of the noise components Nsph(i) and the higher static pressure fluctuations Fsph(i) may approximately be 0. The noise component Nsph(i) and the lower static pressure fluctuation Fspl(i) are also independent from each other. The total sum of the products of the noise components Nsph(i) and the lower static pressure fluctuations Fspl(i) may approximately be 0. The noise component Nsph(i) and the noise component Nspl(i) are also independent from each other. The total sum of the products of the noise components Nsph(i) and the noise components Nspl(i) may approximately be 0.

Thus, there are ignorable the product of the higher static pressure fluctuation Fsph(i) and the noise component Nsph(i), the product of the lower static pressure fluctuation Fspl(i) and the noise component Nspl(i), the product of the noise component Nsph(i) and the higher static pressure fluctuation Fsph(i), the product of the noise component Nsph(i) and the lower static pressure fluctuation Fspl(i), and the product of the noise component Nsph(i) and the noise component Nspl(i).

The above-mentioned equation (17) may be expanded to the following equation (18).

$$\Sigma[\{Fsph(i)+Nsph(i)\}\cdot\{Fsph(i)-Fspl(i)+Nsph(i)-Nspl(i)\}]=\Sigma\{Fsph(i)^2-Fsph(i)\cdot Fspl(i)+Nsph(i)^2\} \quad (18)$$

The square of the noise component Nspl(i)² is extremely small. This means that the first correlation coefficient Cor1 has a remarkably reduced dependency on the noise component of the output signal from the differential pressure transmitter 5. Similarly, the second correlation coefficient Cor2 also has a remarkably reduced dependency on the noise component of the output signal from the differential pressure transmitter 5. The first and second correlation coefficients Cor1 and Cor2 can be used to detect a blockage in each of the higher and lower pressure impulse lines 3 and 4 at high sensitivity, independently of noises of the output signals from the differential pressure transmitter 5.

For example, if a premature blockage is caused in an impulse line, the fluctuation of the differential pressure or of the static pressure can be small so that the above-described conventional technique can not be used to distinguish the fluctuation from noises of output signals from the differential pressure transmitter 5. Thus, the above-described conventional technique can not be used to accurately determine a premature blockage of the impulse line. However, the above-described apparatus and method in accordance with the embodiment can detect the fluctuation independently of noises of the output signal from the differential pressure transmitter 5. Thus, the above-described apparatus and method can accurately detect a premature blockage of the impulse line.

Blockages of the higher and lower pressure impulse lines 3 and 4 can be expressed by the response time constants of the higher and lower pressure impulse lines 3 and 4, respectively. If the higher and lower pressure impulse lines 3 and 4 are free of any blockage, then the higher and lower pressure impulse lines 3 and 4 have almost the same response time constant. Thus, the blockage rate F is approximately 0. If the blockage rate F is apparently different from 0 even the higher and lower pressure impulse lines 3 and 4 are free of any blockage, then this indicates that the higher and lower pressure impulse lines 3 and 4 have abnormal response time constant or constants. The abnormal response time constant or constants suggest that the higher and lower pressure impulse lines 3 and 4 might be different in length, or either one or both of the higher and lower pressure impulse lines 3 and 4 are closed by valves. Namely, the above-described apparatus and method in accordance with the embodiment can detect not only a blockage of impulse lines but also other abnormality of the impulse lines.

In accordance with the above-described embodiment, the first and second correlation coefficients Cor1 and Cor2 can be used to calculate the intermediate variable Z. It is possible as a modification to calculate a ratio (K=Ssph/Sspl) of the square sum Ssph of the higher static pressure fluctuations Fsph(i) to the square sum Sspl of the lower static pressure fluctuations Fspl(i). The blockage rate F can be calculated from the ratio K by using the following equation (19). In accordance with this method, the first and second correlation coefficients Cor1 and Cor2 are not used.

$$F=(1-K)/(1+K) \quad (19)$$

In this case, the blockage rate F is normalized within the range of −1 to +1. This method reduces the load to calculation operation but allows deterioration of the sensitivity or accuracy in detecting a blockage of the impulse lines. This method also allows deterioration of the accuracy in detecting a premature blockage of the impulse lines. This method can be realized by modifying the apparatus shown in FIG. 1. The modified apparatus does not include the differential pressure fluctuation calculating unit 6, the differential pressure square sum calculating unit 9, the correlation coefficient calculating unit 12, and the intermediate variable calculating unit 13. The blockage rate calculating unit 14 may be modified to receive the square sum Ssph of the higher static pressure fluctuations Fsph(i) from the higher static pressure square-sum calculating unit 10. The blockage rate calculating unit 14 may also be modified to receive the square sum Sspl of the lower static pressure fluctuations Fspl(i) from the lower static pressure square-sum calculating unit 11. The blockage rate calculating unit 14 may be modified to calculate a ratio (K=Ssph/Sspl) of the square sum Ssph of the higher static pressure fluctuations Fsph(i) to the square sum Sspl of the lower static pressure fluctuations Fspl(i). The blockage rate calculating unit 14 may be modified to calculate the blockage rate F from the ratio K in accordance with the above-mentioned equation (19).

The above-mentioned differential pressure fluctuation Fdp (i) can be calculated by using the above-mentioned equation (3) instead of the above-mentioned equation (4), provided that the suffixes are changed in the equation (3). Namely, the above-mentioned equation (3) can be used to eliminate a transient variation of the differential pressure, so as to detect the fluctuation component only.

As used herein, the following directional terms "upstream and downstream" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, section or part of a device includes hardware and/or software that is constructed and/or programmed to carry out the desired function.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An apparatus for detecting a blockage of an impulse line, the apparatus comprising:
    a pressure detecting unit configured to detect in time series a higher static pressure that travels through a higher pressure impulse line and generate time series data sets of the higher static pressure, the pressure detecting unit being configured to detect in time series a lower static pressure that travels through a lower pressure impulse line and generate time series data sets of the lower static pressure, the pressure detecting unit being configured to detect in time series a differential pressure between the higher and lower pressure impulse lines and generate time series data sets of the differential pressure;
    a first fluctuation calculating unit configured to calculate time series data sets of a differential pressure fluctuation based on the time series data sets of the differential pressure;
    a second fluctuation calculating unit configured to calculate time series data sets of a higher static pressure fluctuation based on the time series data sets of the higher static pressure;
    a third fluctuation calculating unit configured to calculate time series data sets of a lower static pressure fluctuation based on the time series data sets of the lower static pressure;
    a first square sum calculating unit configured to calculate the square sum of the time series data sets of the differential pressure fluctuation;
    a second square sum calculating unit configured to calculate the square sum of the time series data sets of the higher static pressure fluctuation;
    a third square sum calculating unit configured to calculate the square sum of the time series data sets of the lower static pressure fluctuation;
    a correlation coefficient calculating unit configured to calculate a first correlation coefficient based on the time series data sets of the differential pressure fluctuation, the time series data sets of the higher static pressure fluctuation, the square sum of the time series data sets of the differential pressure fluctuation, and the square sum of the time series data sets of the higher static pressure fluctuation, and the correlation coefficient calculating unit being configured to calculate a second correlation coefficient based on the time series data sets of the differential pressure fluctuation, the time series data sets of the lower static pressure fluctuation, the square sum of the time series data sets of the differential pressure fluctuation, and the square sum of the time series data sets of the lower static pressure fluctuation;
    an intermediate variable calculating unit configured to calculate an intermediate variable based on the first and second correlation coefficients;
    a blockage rate calculating unit configured to calculate a blockage rate based on the intermediate variable; and
    a determination unit configured to determine a blockage of each of the higher and lower pressure impulse lines with reference to the blockage rate.

2. An apparatus for detecting a blockage of an impulse line, the apparatus comprising:
    a pressure detecting unit configured to detect in time series a higher static pressure that travels through a higher pressure impulse line and generate time series data sets of the higher static pressure, the pressure detecting unit being configured to detect in time series a lower static pressure that travels through a lower pressure impulse line and generate time series data sets of the lower static pressure;
    a first fluctuation calculating unit configured to calculate time series data sets of a higher static pressure fluctuation based on the time series data sets of the higher static pressure;
    a second fluctuation calculating unit configured to calculate time series data sets of a lower static pressure fluctuation based on the time series data sets of the lower static pressure;
    a first square sum calculating unit configured to calculate the square sum of the time series data sets of the higher static pressure fluctuation;
    a second square sum calculating unit configured to calculate the square sum of the time series data sets of the lower static pressure fluctuation;
    a ratio calculating unit configured to calculate a ratio of the square sum of the time series data sets of the higher static pressure fluctuation to the square sum of the time series data sets of the lower static pressure fluctuation;
    a blockage rate calculating unit configured to calculate a blockage rate based on the ratio; and
    a determination unit configured to determine a blockage of each of the higher and lower pressure impulse lines with reference to the blockage rate.

3. A method of detecting a blockage of an impulse line, the method comprising:
    detecting in time series a higher static pressure that travels through a higher pressure impulse line to generate time series data sets of the higher static pressure;
    detecting in time series a lower static pressure that travels through a lower pressure impulse line to generate time series data sets of the lower static pressure;

detecting in time series a differential pressure between the higher and lower pressure impulse lines to generate time series data sets of the differential pressure;

calculating time series data sets of a differential pressure fluctuation based on the time series data sets of the differential pressure;

calculating time series data sets of a higher static pressure fluctuation based on the time series data sets of the higher static pressure;

calculating time series data sets of a lower static pressure fluctuation based on the time series data sets of the lower static pressure;

calculating the square sum of the time series data sets of the differential pressure fluctuation;

calculating the square sum of the time series data sets of the higher static pressure fluctuation;

calculating the square sum of the time series data sets of the lower static pressure fluctuation;

calculating a first correlation coefficient based on the time series data sets of the differential pressure fluctuation, the time series data sets of the higher static pressure fluctuation, the square sum of the time series data sets of the differential pressure fluctuation, and the square sum of the time series data sets of the higher static pressure fluctuation;

calculating a second correlation coefficient based on the time series data sets of the differential pressure fluctuation, the time series data sets of the lower static pressure fluctuation, the square sum of the time series data sets of the differential pressure fluctuation, and the square sum of the time series data sets of the lower static pressure fluctuation;

calculating an intermediate variable based on the first and second correlation coefficients;

calculating a blockage rate based on the intermediate variable; and determining a blockage of each of the higher and lower pressure impulse lines with reference to the blockage rate.

4. A method of detecting a blockage of an impulse line, the method comprising:

detecting in time series a higher static pressure that travels through a higher pressure impulse line to generate time series data sets of the higher static pressure, detecting in time series a lower static pressure that travels through a lower pressure impulse line to generate time series data sets of the lower static pressure;

calculating time series data sets of a higher static pressure fluctuation based on the time series data sets of the higher static pressure;

calculating time series data sets of a lower static pressure fluctuation based on the time series data sets of the lower static pressure;

calculating the square sum of the time series data sets of the higher static pressure fluctuation;

calculating the square sum of the time series data sets of the lower static pressure fluctuation;

calculating a ratio of the square sum of the time series data sets of the higher static pressure fluctuation to the square sum of the time series data sets of the lower static pressure fluctuation;

calculating a blockage rate based on the ratio; and determining a blockage of each of the higher and lower pressure impulse lines with reference to the blockage rate.

5. The apparatus for detecting a blockage of an impulse line according to claim 1, wherein the determining of the blockage of the higher pressure impulse line includes comparing the blockage rate to a first threshold and the determining of the blockage of the lower pressure impulse line includes comparing the blockage rate to a second threshold.

6. The apparatus for detecting a blockage of an impulse line according to claim 2, wherein the determining of the blockage of the higher pressure impulse line includes comparing the blockage rate to a first threshold and the determining of the blockage of the lower pressure impulse line includes comparing the blockage rate to a second threshold.

7. The method of detecting a blockage of impulse line according to claim 3, wherein the determining of the blockage of the higher pressure impulse line includes comparing the blockage rate to a first threshold and the determining of the blockage of the lower pressure impulse line includes comparing the blockage rate to a second threshold.

8. The method of detecting a blockage of impulse line according to claim 4, wherein the determining of the blockage of the higher pressure impulse line includes comparing the blockage rate to a first threshold and the determining of the blockage of the lower pressure impulse line includes comparing the blockage rate to a second threshold.

9. The apparatus for detecting a blockage of an impulse line according to claim 1, wherein the determination unit is configured to determine the blockage of each of the higher and lower pressure impulse lines based on the blockage rate.

10. The apparatus for detecting a blockage of an impulse line according to claim 2, wherein the determination unit is configured to determine the blockage of each of the higher and lower pressure impulse lines based on the blockage rate.

11. The method of detecting a blockage of an impulse line according to claim 3, wherein determining the blockage of each of the higher and lower pressure impulse lines includes determining the blockage of each of the higher and lower pressure impulse lines based on the blockage, rate.

12. The method of detecting a blockage of an impulse line according to claim 4, wherein determining the blockage of each of the higher and lower pressure impulse lines includes determining the blockage of each of the higher and lower pressure impulse lines based on the blockage rate.

* * * * *